United States Patent
Matsushima

(10) Patent No.: US 8,682,949 B2
(45) Date of Patent: *Mar. 25, 2014

(54) PROXIMITY DETECTION DEVICE AND PROXIMITY DETECTION METHOD

(75) Inventor: Kenichi Matsushima, Chiba (JP)

(73) Assignee: Seiko Instruments Inc. (JP)

( * ) Notice: Subject to any disclaimer, the term of this patent is extended or adjusted under 35 U.S.C. 154(b) by 738 days.

This patent is subject to a terminal disclaimer.

(21) Appl. No.: 12/806,653

(22) Filed: Aug. 18, 2010

(65) Prior Publication Data

US 2011/0055305 A1    Mar. 3, 2011

(30) Foreign Application Priority Data

Aug. 26, 2009    (JP) .................................. 2009-195970

(51) Int. Cl.
    G06F 17/14        (2006.01)
(52) U.S. Cl.
    USPC ........................................................ 708/400
(58) Field of Classification Search
    USPC ........................................................ 708/400
    See application file for complete search history.

(56) References Cited

U.S. PATENT DOCUMENTS

| | | | |
|---|---|---|---|
| 6,239,788 B1 * | 5/2001 | Nohno et al. ................ | 345/173 |
| 6,452,514 B1 | 9/2002 | Philipp | |
| 8,106,668 B2 * | 1/2012 | Matsushima ................ | 324/686 |
| 2007/0109274 A1 | 5/2007 | Reynolds | |
| 2008/0158167 A1 | 7/2008 | Hotelling et al. | |
| 2008/0265914 A1 * | 10/2008 | Matsushima ................ | 324/686 |

FOREIGN PATENT DOCUMENTS

| | | | |
|---|---|---|---|
| JP | 09292950 | | 11/1997 |
| JP | 2000148376 | | 5/2000 |
| JP | 2000148376 A | * | 5/2000 |
| JP | 2000259348 | | 9/2000 |
| JP | 2000259348 A | * | 9/2000 |

* cited by examiner

Primary Examiner — Tan V. Mai
(74) Attorney, Agent, or Firm — Adam & Wilks

(57) ABSTRACT

A proximity detection device has transmitting and receiving electrodes and a multiline driving unit that simultaneously applies periodic alternating voltages to at least two of the transmitting electrodes. A measurement unit measures currents or amounts of accumulated charge from the receiving electrodes in synchronization with the simultaneous application of periodic alternating voltages to the at least two transmitting electrodes by the multiline driving unit. A linear computing unit performs linear computation of measurement results from a measurement unit in response to electrostatic capacitances of respective intersections between the transmitting and receiving electrodes. The linear computing unit has a memory unit that stores an output of the linear computation for readout at plural times. A proximity computing unit performs a computation to determine an approach and/or a position of an object relative to a detection area based on the output from the linear computing unit stored in the memory unit.

20 Claims, 9 Drawing Sheets

PROXIMITY DETECTION DEVICE AND PROXIMITY DETECTION METHOD

BACKGROUND OF THE INVENTION

1. Field of the Invention

The present invention relates to a proximity detection device for detecting an approach and a position of an object by a human finger or the like by changes in electrostatic capacitances of respective intersections of plural electrodes arranged in correspondence with two-dimensional coordinates.

2. Description of the Related Art

It is known that, when an object of a human finger or the like approaches between two closely located electrodes, the electrostatic capacitance between the electrodes changes. Proximity detection devices such as an electrostatic touch sensor to which the principle is applied to the detection of the electrostatic capacitances of respective intersections of plural electrodes arranged in correspondence with two-dimensional coordinates in a detection area have been disclosed, and some of them have been put into practical use (for example, see JP-T-2003-526831).

An example of the conventional proximity detection device will be explained based on FIG. 8.

In the example of FIG. 8, in a detection area 2 of a supporting unit 1, transmitting electrodes 3 corresponding to longitudinal coordinates and receiving electrodes 4 corresponding to lateral coordinates are arranged orthogonally to each other. To the transmitting electrodes 3, a periodic alternating voltage is line-sequentially applied with respect to each electrode from a line-sequential driving unit 35. The alternating voltage is transmitted to the receiving electrode 4 by the electrostatic coupling of the intersection between the transmitting electrode 3 and the receiving electrode 4. In a current measurement unit 6, values corresponding to the electrostatic couplings of the respective corresponding intersections from currents flowing in the virtually grounded receiving electrodes 4 are detected, and the detected values are output to a proximity computing unit 8. Here, in order to accumulate and obtain weak alternating currents, accumulation capacitors have been switched in synchronization with periodic alternating voltages sequentially and selectively applied to the transmitting electrodes 3 or the currents have been accumulated by convolving demodulated waveforms.

However, in the case of the example shown in FIG. 8, detection efficiency has been problematic because of line-sequential driving. To solve the problem, a multiline-driven proximity detection device as shown in FIG. 2 has been disclosed. In the example of FIG. 2, the transmitting electrodes 3 corresponding to the longitudinal coordinates and the receiving electrodes 4 corresponding to the lateral coordinates are arranged orthogonally to each other in the detection area 2 of the supporting unit 1. To the transmitting electrodes 3, different patterned waveforms are simultaneously applied to the plural transmitting electrodes 3 from a multiline driving unit 5. The waveform is transmitted to the receiving electrode 4 by the electrostatic coupling of the intersection between the transmitting electrode 3 and the receiving electrode 4. In a current measurement unit 6, currents flowing into the virtually grounded receiving electrodes 4 are measured.

Here, a computing unit 10b includes a correlation computing unit 17 and a proximity computing unit 8, obtains electrostatic capacitances of intersections between the respective transmitting electrodes and receiving electrodes 4 or their changes from correlations between the patterns applied to the transmitting electrodes 3 and the measurement values of the current measurement unit 6 in the correlation computing unit 17, and computes the position of the approaching object by weighted average or the like in the proximity computing unit 8 (for example, see JP-A-9-292950).

Further, a method for effective detection with significantly increased number of times of charging and discharging by modulating and driving carriers according to the patterns applied to the transmitting electrodes 3, has been disclosed (for example, see JP-T-2009-516295).

In the above described conventional proximity device using multiline driving, there have been problems that the amount of computation in the correlation computing unit is large and a high-speed computer is necessary for higher detection speed. Further, in the case where the patterns applied to the transmitting electrodes are not completely orthogonal, there has been a problem that crosstalk occurs in the correlation computation result.

Accordingly, in the invention, in order to solve the problems in the conventional art, a device and method as described below are provided.

That is, there are provided a device and method, even in the case where the patterns applied to the transmitting electrodes are not completely orthogonal, that can obtain values in response to the electrostatic capacitances of the respective intersections of the detection panel without crosstalk by treating the patterns applied to the transmitting electrodes and characteristics of a detection panel as matrices and multiplying the measurement values of the current measurement unit by an inverse matrix of the patterns applied to the transmitting electrodes.

Further, there are provided a device and method that can perform detection at a high speed detection without using a high-speed computer by providing a memory unit that stores an interim result of the computation of $\Rightarrow$ using an inverse matrix and using patterns applied to the transmitting electrodes for enabling faster computation through the utilization of the memory unit.

SUMMARY OF THE INVENTION

In order to solve the problems, the invention discloses the following aspects.

A first aspect of the invention is directed to a proximity detection device of obtaining an approach determination or an approach position of an object, including plural transmitting electrodes corresponding to one dimension of two dimensions in a detection area on a supporting unit and receiving electrodes corresponding to the other dimension, a multiline driving unit that simultaneously applies periodic alternating voltages to at least two electrodes of the transmitting electrodes, a current measurement unit that measures currents or amounts of accumulated charge from the receiving electrodes in synchronization with driving to the transmitting electrodes, a computing unit that obtains the approach determination or the approach position of the object toward the detection area by converting the current values or the amounts of accumulated charge measured in the current measurement unit into values in response to electrostatic capacitances of respective intersections between the transmitting electrodes and the receiving electrodes, and a control unit that manages statuses and sequences of the multiline driving unit, the current measurement unit, and the computing unit, wherein the computing unit includes a linear computing unit that performs linear computation to convert the current values or the amounts of accumulated charge measured in the current measurement unit into values in response to the electrostatic capacitances of the respective intersections between the transmitting electrodes and the receiving electrodes, and a proximity computing unit that obtains the approach determination or the approach position of the object toward the detection area from an output of the linear computing unit, and the linear computing unit includes a memory unit that stores an interim result of the computation to be read out at plural times.

A second aspect of the invention is directed to the first aspect, wherein the linear computing unit performs fast Hadamard transform or transform equal to the fast Hadamard transform.

A third aspect of the invention is directed to the first and second aspects, wherein a pattern driven by the multiline driving unit is an inverse matrix of an Hadamard matrix or an inverse matrix of a submatrix of an Hadamard matrix.

A fourth aspect of the invention is directed to the second and third aspects, wherein a transmission voltage matrix that determines a pattern driven by the multiline driving unit is an Hadamard matrix according to the Sylvester's construction method, a matrix in which rows or columns of an Hadamard matrix according to the Sylvester's construction method are exchanged, or a matrix formed by multiplying a specified row of a submatrix thereof by "−1", and computation equal to multiplication by "−1" of measurement values of the current measurement unit corresponding to the row multiplied by "−1" is performed in the fast Hadamard transform or transform equal to the fast Hadamard transform in the linear computing unit.

A fifth aspect of the invention is directed to the second and third aspects, wherein a transmission voltage matrix that determines a pattern driven by the multiline driving unit is an Hadamard matrix according to the Sylvester's construction method, a matrix in which rows or columns of an Hadamard matrix according to the Sylvester's construction method are exchanged, or a matrix formed by multiplying a specified column of a submatrix thereof by "−1", and computation equal to multiplication by "−1" of conversion values corresponding to the column multiplied by "−1" is performed in the fast Hadamard transform or the equal transform to the fast Hadamard transform in the linear computing unit.

A sixth aspect of the invention is directed to an information equipment including an input device according to the proximity detection device as the first through fifth aspects.

A seventh aspect of the invention is directed to the sixth aspect, wherein the information equipment includes a cellular phone.

An eighth aspect of the invention is directed to the sixth aspect, wherein the information equipment includes a multimedia player.

A ninth aspect of the invention is directed to the sixth aspect, wherein the information equipment includes a navigation system.

A tenth aspect of the invention is directed to the sixth aspect, wherein the information equipment includes a computer.

According to the aspects of the invention, a proximity detection device and method that can successfully perform detection without crosstalk by simultaneously applying alternating voltages to plural transmitting electrodes even when driving at a relatively low voltage or operating at a high speed can be realized. When power supply voltage, the detection speed, and the frequencies of the alternating voltages are the same, a proximity detection device and method that can make the influence of noise smaller can be realized.

DETAILED DESCRIPTION OF THE INVENTION

Hereinafter, an embodiment of the invention will be described in detail with reference to the drawings.

Embodiment

A preferred embodiment of the invention will be explained based on FIG. 1.

Figure 1:
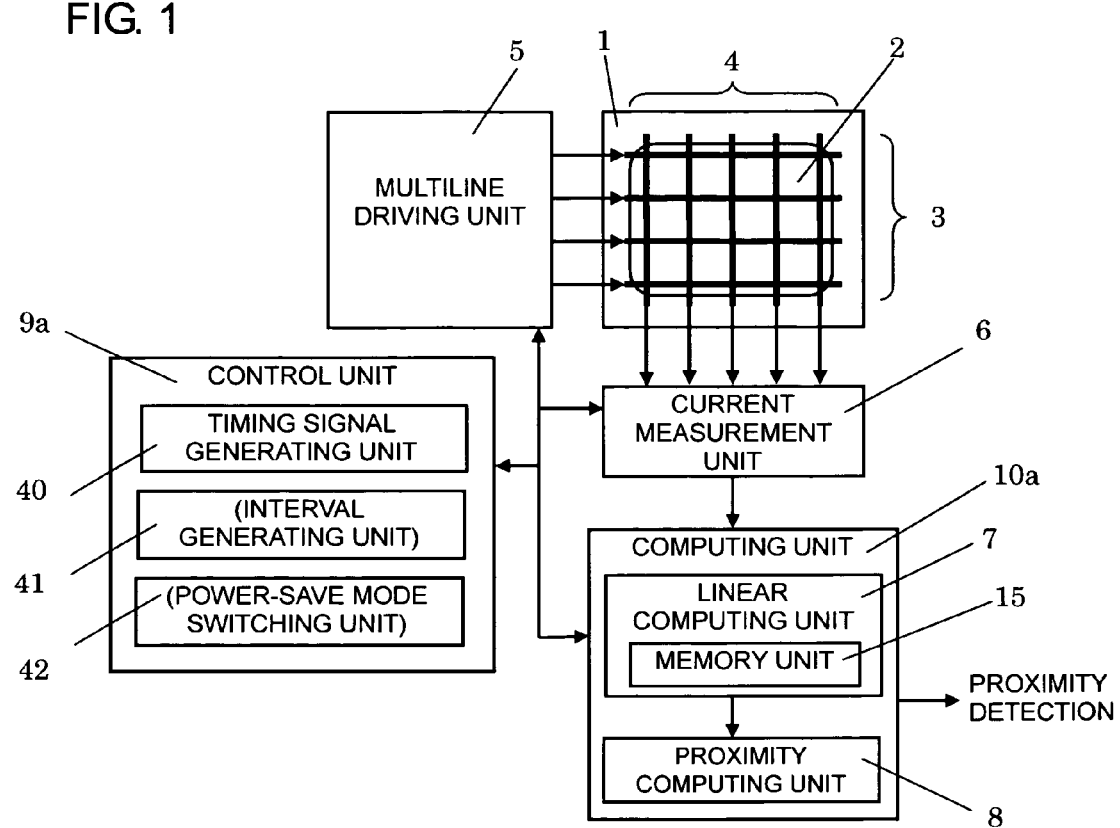
FIG. 1 is a block diagram showing one preferred embodiment of a proximity detection device according to the invention.
Figure 2:
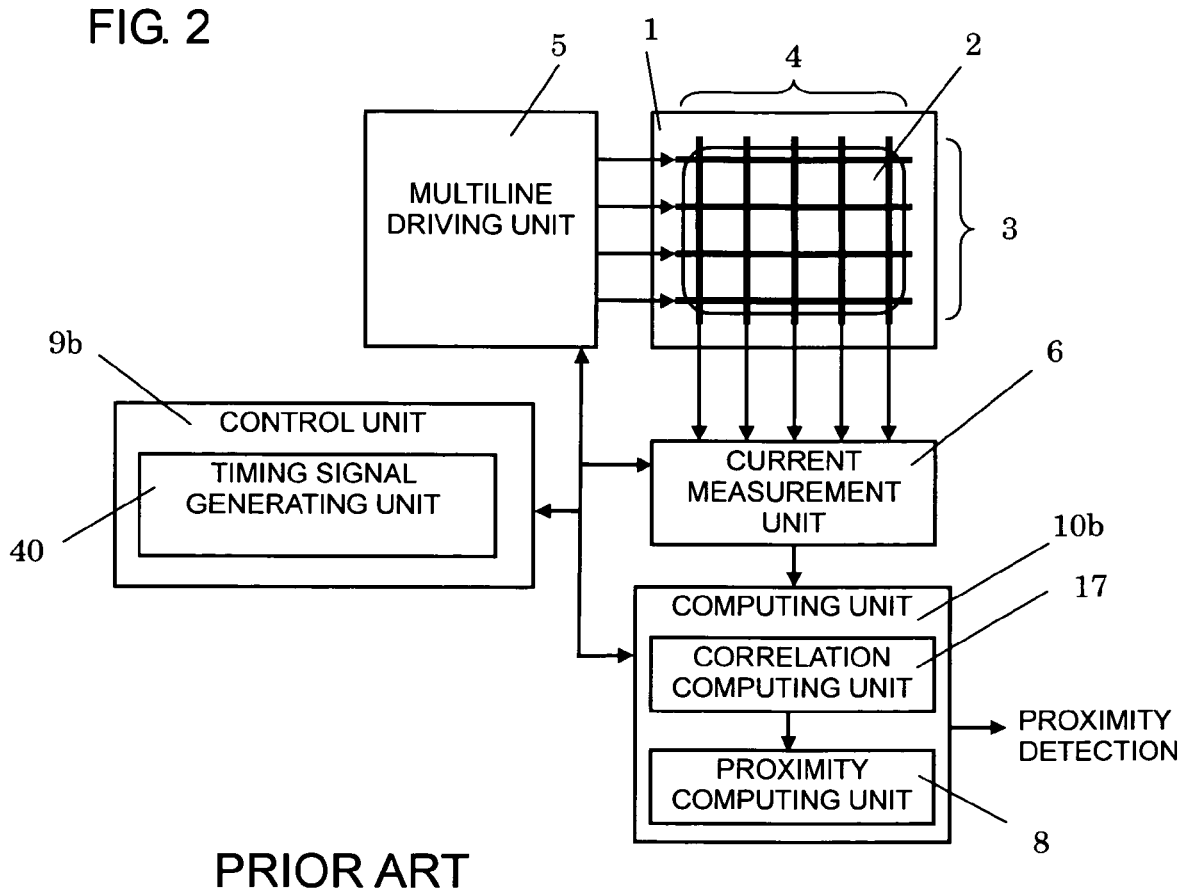
FIG. 2 is a block diagram showing a conventional proximity detection device.

A proximity detection device according to the invention includes, in FIG. 1, transmitting electrodes 3 corresponding to one dimension of two dimensional coordinates in a detection area 2 on a supporting unit 1 and receiving electrodes 4 corresponding to the other dimension provided via insulating layers for preventing electric continuity between them, a multiline driving unit 5 that simultaneously applies periodic alternating voltages to plural electrodes of the transmitting electrodes 3, a current measurement unit 6 that measures the magnitudes of the currents from the receiving electrodes 4 changing in response to the electrostatic couplings of the intersections between the transmitting electrodes 3 and the receiving electrodes 4 in synchronization with the driving to the transmitting electrodes 3, a computing unit 10a that obtains an approach determination and an approach position of an object toward the detection area 2 by values obtained by converting current values measured in the current measurement unit 6 into values in response to the electrostatic couplings of the respective intersections between the transmitting electrodes 3 and the receiving electrodes 4 and their transition, and a control unit 9a that manages the entire statuses and sequences. The computing unit 10a includes a linear computing unit 7 that converts the current values measured in the current measurement unit 6 into the values in response to the electrostatic couplings of the respective intersections between the transmitting electrodes 3 and the receiving electrodes 4, and a proximity computing unit 8 that obtains the approach determination and the approach position of the object toward the detection area 2 by the values in response to the electrostatic couplings of the respective intersections from the linear computing unit 7 or their transition.

Figure 5:
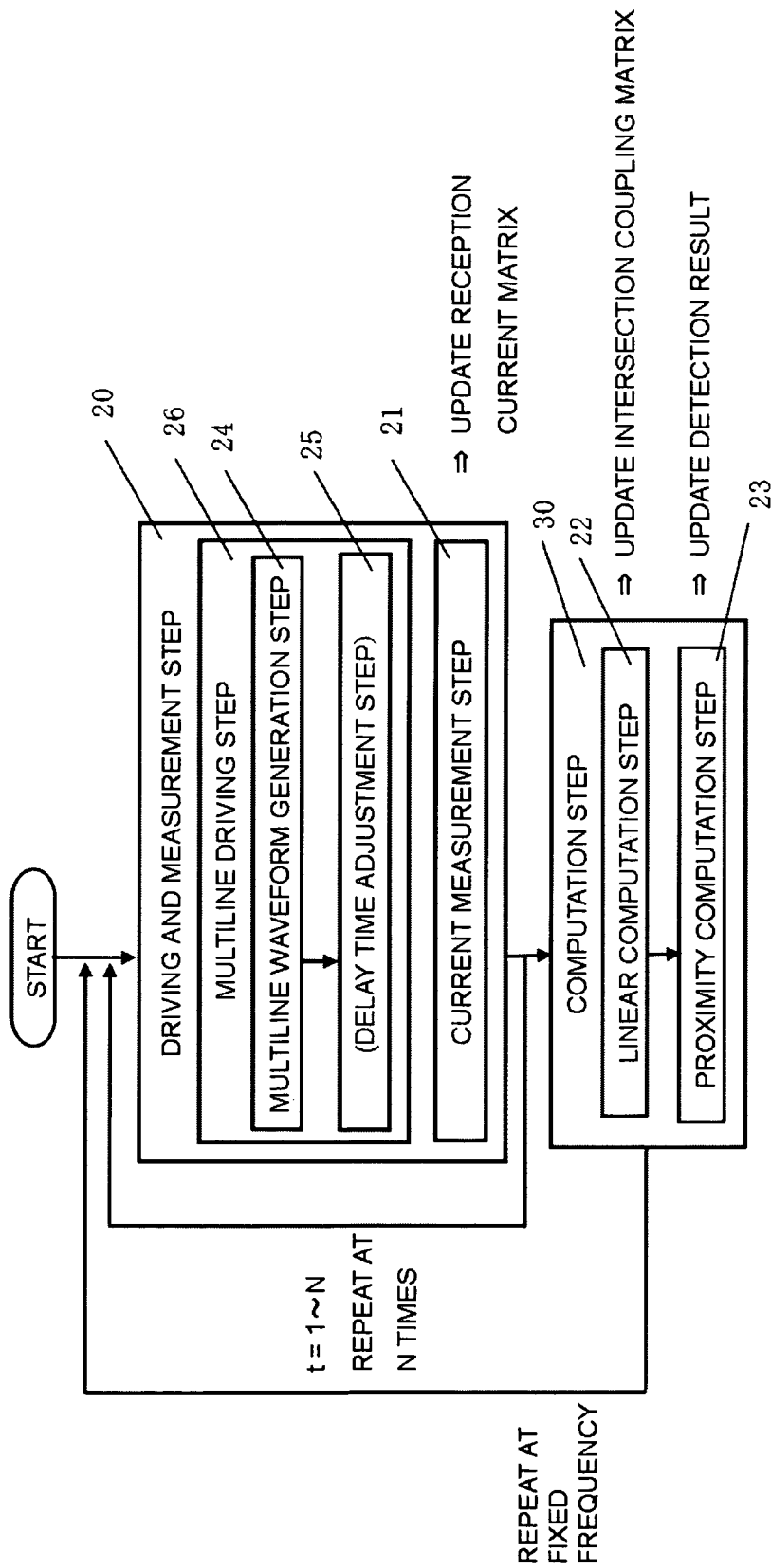
FIG. 5 is a process flow chart of a proximity detection method according to the invention.

The features of the invention will be explained with reference to FIGS. 1 and 5 and based on the differences from the conventional example.

(1) Difference of the computing unit 10a or a computation step 30. The conventional correlation computing unit 17 is replaced by the linear computing unit 7 of the invention. Conventionally, in order to obtain electrostatic capacitances of intersections of the respective transmitting electrodes 3 and receiving electrodes 4 and their changes, correlations between the patterns applied to the transmitting electrodes 3 and the current values measured in the current measurement unit 6 have been computed, however, in the invention, there is a difference in that values in response to the electrostatic capacitances of the respective intersections can be obtained by treating the patterns applied to the transmitting electrodes 3 and characteristics of a detection panel as matrices and multiplying the measurement values of the current measurement unit 6 by an inverse matrix of the patterns applied to the transmitting electrodes 3.

(2) Addition of an interval generating unit 41 that provides random intervals to the control unit 9a. In the invention, for the purpose of making the influence of noise random, random intervals are inserted between output times from the transmitting electrodes 3 according to need. Thereby, the influence of noise may be made random in the multiline driving.

(3) Addition of a power-save mode switching unit 42 to the control unit 9a. In the invention, because of the multiline driving, to accurately obtain the approach position of a finger, it is necessary to drive the respective transmitting electrodes 3 at the same number of times as the number of the transmitting electrodes 3 as measurement for one period. However, in the case where it is not necessary to know the accurate approach position such that the target of detection of a human finger or the like does not approach the detection area 2, suppression of power consumption can be realized by driving the respective transmitting electrodes 3 in the smaller number of times than the number of transmitting electrodes 3 as measurement for one period. Accordingly, the presence or absence of the approach of the target of detection such as a finger is determined, so-called the approach determination, by the power-save mode switching unit 42, if the target of detection such as a finger does not approach, the mode is switched to a mode of driving the respective transmitting electrodes 3 in the smaller number of times than the number of transmitting electrodes 3 in measurement for one period, so-called the power-save mode, and, if the target of detection such as a finger approaches, the mode is switched to a mode of driving the respective transmitting electrodes 3 in the same number of times as the number of transmitting electrodes 3 in measurement for one period by the power-save mode switching unit 42. In the above described power-save mode, suppression of power consumption can be expected if the electrodes are driven in the smaller number of times than the number of the respective transmitting electrodes 3, and the case of single driving may be the most preferable. In this case, the detected position of the detection area 2 is not located, however, information on the presence or absence of detection in the whole detection area 2 can be obtained. When the target of detection such as a finger is detected in the power-save mode, the power consumption may be suppressed by switching the mode from the power-save mode to the mode of driving the respective transmitting electrodes 3 in the number of transmitting electrodes 3 in measurement for one period.

As below, the respective unit and the respective steps forming the proximity detection device and method according to the invention will be explained in detail.

In the detection area 2 of the supporting unit 1, for example, the transmitting electrodes 3 corresponding to the longitudinal coordinates and the receiving electrodes 4 corresponding to the lateral coordinates are arranged orthogonally to each other. These electrodes are conductive and both electrodes are galvanically isolated by the insulating layers at the intersections between the transmitting electrodes 3 and the receiving electrodes 4 and electrically and electrostatically coupled.

Here, for convenience of explanation, the transmitting electrode 3 is present with respect to each corresponding position represented by coordinate values of natural numbers from 1 to N, and the corresponding transmitting electrodes 3 are discriminated by the indexes n. Similarly, the receiving electrode 4 is present with respect to each corresponding position represented by coordinate values of natural numbers from 1 to M, and the corresponding receiving electrodes 4 are discriminated by the indexes m.

Further, the arrangement of the transmitting electrodes 3 and the receiving electrodes 4 is not limited to the nearly orthogonal plane as in the above described embodiment, but any arrangement may be employed as long as the electrodes correspond to two dimensional coordinates such as oblique coordinates and circular polar coordinates of angles and distances from the origin. The multiline driving unit 5 applies the periodic alternating voltages corresponding to a transmission voltage matrix T(t,n) indicating the drive pattern to the plural transmitting electrodes 3. The index t of the transmission voltage matrix T is a row number of the matrix corresponding to tth driving, and the index n is a column number corresponding to the nth transmitting electrode 3. For example, the alternating voltage applied to the transmitting electrode 3 in the second driving corresponds to T(2,3).

The simultaneously applied plural alternating voltage waveforms are plural alternating voltage waveforms obtained by multiplying a certain identical alternating voltage waveform by respectively corresponding elements T(t,n) of the transmission voltage matrix as factors. Therefore, in the case where the elements of the transmission voltage matrix are negative, that unit application of alternating voltage waveforms in reversed phase. In this regard, if the direct-current components are superimposed, they have no influence.

Here, the transmission voltage matrix T(t,n) is a regular matrix as a square matrix having an inverse matrix. Accordingly, the index t is a natural number from 1 to the number of transmitting electrodes N. In the case of the conventional line-sequential driving, the transmission voltage matrix T(t,n) is identical with the unit matrix I(t,n).

Further, the periodic alternating voltage is rectangular wave, sin wave, triangular wave, or the like. Note that, since the respective electrodes themselves have resistance values and electrostatic capacitances, the high frequencies attenuate, and, at the intersections, the low frequencies attenuate due to the electrostatic capacitances in series. In view of the facts, it is desirable to set the frequencies of the voltages applied to the transmitting electrodes 3 to frequencies with low attenuation.

Figure 3:
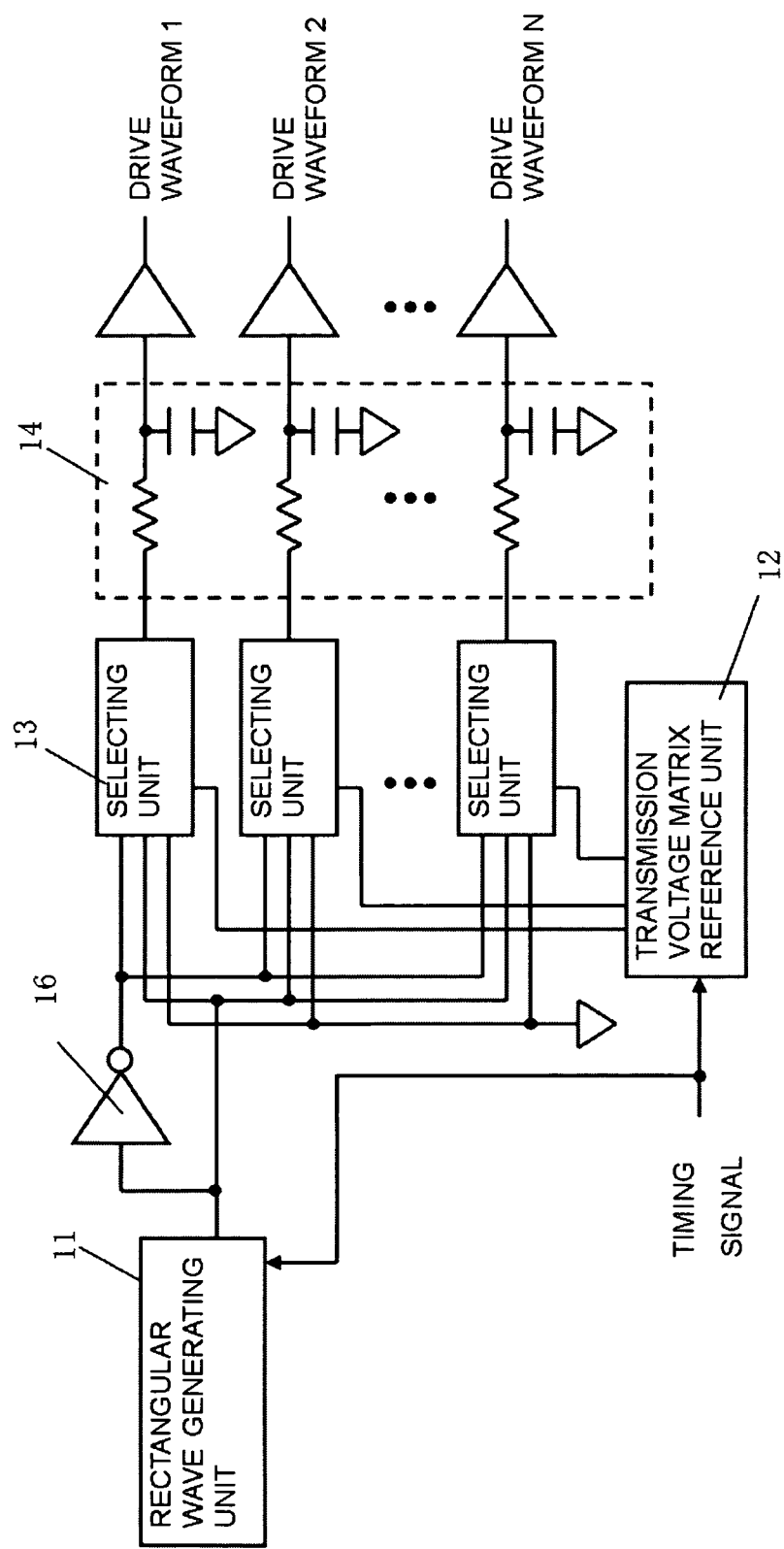
FIG. 3 is a block diagram showing an embodiment of a multiline driving unit according to the invention.

To further simplify the configuration, for example, using a regular matrix as the transmission voltage matrix T(t, n) by setting the respective elements to "1", "0", or "−1" such that the absolute values of the respective elements except "0" may be the same value, and using rectangular waves as the periodic alternating voltages, for example, the multiline driving unit 5 can be formed with a simple logical circuit as shown in FIG. 3.

Here, the configuration in FIG. 3 will be explained. The timing signals corresponding to the row number t of the transmission voltage matrix are output from a timing signal generating unit 40 within the control unit 9a in FIG. 1 to transmission voltage matrix reference unit 12 in FIG. 3, and the timing signals for generating rectangular waves in synchronization are output to rectangular wave generating unit 11. The rectangular wave generating unit 11 generates plural cycles of rectangular waves based on the above described timing signals, and is connected to N pieces of selecting unit 13 using two kinds of wires of a wire via an inverter 16 and a wire not via the inverter 16. The selecting unit 13 selects the wire not via the inverter 16 if the values of the corresponding elements of the transmission voltage matrix are "1", selects the wire via the inverter 16 if the values of the corresponding elements of the transmission voltage matrix are "−1", and selects a wire of 0 V if the values of the corresponding elements of the transmission voltage matrix are "0". The signal selected by the selecting unit 13 passes through a delay time adjustment unit 14 according to need, and is output as a drive waveform. A resistor is series-connected to the above described delay time adjustment unit 14, and the other terminal of a capacitor connected to a constant-voltage power supply is connected via the resistor. At the output of the delay time adjustment unit 14, a buffer may be provided according to need for lowering the impedance.

If a certain element of the transmission voltage matrix T(t,n) to the transmission voltage matrix reference unit 12 is "0", in order to make the alternating voltage waveform corresponding to the element, 0 V is connected to the transmitting electrode 3 by the selecting unit 13, for example. The voltages selected by the selecting units 13 are similarly connected to the transmitting electrodes 3 in the other elements. In this manner, the operation is performed according to the element of the transmission voltage matrix T(t,n).

Note that, since the receiving electrodes 4 in FIG. 1 themselves have resistance values and electrostatic capacitances delay times are produced for transmission of alternating voltages. In FIG. 3, the delay time adjustment unit 14 at the downstream of the selecting unit 13 is for fine adjustment of the times, and provided according to need. This is for fine adjustment of the delay times to the receiving electrodes 4 different depending on the transmitting electrodes 3. That is, for adjustment to the farther transmitting electrodes 3 from the current measurement unit 6, the delay times for the nearer transmitting electrodes 3 are set longer. Thereby, it is expected that the influence by variations in delay times produced to the receiving electrodes 4 is eliminated and transmitted to the current measurement unit 6 at the same time.

The periodic alternating voltage applied to the nth transmitting electrode 3 is transmitted to the mth receiving electrode 4 via the electrostatic coupling at the intersection between the nth transmitting electrode 3 and the mth receiving electrode 4. If there is an influence of contamination on the detection surface or the like, because the impedance of the approaching object itself is high, the electric field between the transmitting electrode 3 and the receiving electrode 4 increases due to the electric field via the approaching object, the electrostatic coupling between the transmitting electrode 3 and the receiving electrode 4 increases, and the reception current flowing in the receiving electrode 4 becomes larger. On the other hand, in the case where an object with relatively low impedance such as a human finger as a target of detection approaches, because the action of absorbing the alternating electric field from the transmitting electrode 3 is stronger, the electrostatic coupling between the transmitting electrode 3 and the receiving electrode 4 decreases, and the reception current flowing in the receiving electrode 4 becomes smaller. Therefore, the targets of detection of the contamination and the human finger can easily be discriminated.

Here, the receiving electrode 4 is suppressed in voltage variations by grounding or virtual grounding so that there is no influence even when an object approaches other parts than around the intersection of the target of detection. Accordingly, the transmission to the receiving electrode 4 is a current not a voltage. That is, since the alternating electric field is generated by the electrostatic coupling at the intersection between the selected transmitting electrode 3 and a certain receiving electrode 4, a reception current flows in the receiving electrode 4. Therefore, at the intersection where the object approaches, the alternating electric field changes and the reception current flowing in the receiving electrode 4 changes.

In the current measurement unit 6, at each time when the alternating voltage waveform corresponding to the transmission voltage matrix T(t,n) is applied to the transmitting electrode 3 by the multiline driving unit 5, the reception current flowing in the mth receiving electrode 4 is measured, converted into a digital value by a delta-sigma type AD converter or the like, for example, and the corresponding value of a reception current matrix R(t,m) is updated and output to the linear computing unit 7. The index t here is a row number of the matrix indicating a current by the tth driving in the multiline driving unit 5, and the index m is a column number corresponding to the number of receiving electrode 4.

Here, the values of the electrostatic capacitances of the respective intersections are typically small values of about 1 pF, and the reception currents flowing in the receiving electrodes 4 and their changes are weak. Accordingly, for detection of the reception currents flowing in the receiving electrodes 4, currents in plural periods applied from the transmitting electrodes 3 are accumulated and detected. However, since the reception currents flowing in the receiving electrodes 4 are alternating currents, if they are simply accumulated, an accumulated value becomes zero. To avoid this, the same method as that in the case of the conventional line-sequential driving can be used. That is, accumulation in synchronization with the phases of the alternating currents is performed. For example, the method of switching accumulation capacitors in synchronization with the periodic alternating voltages applied to the transmitting electrodes 3 has been disclosed in JP-T-2003-526831. Further, the method of accumulating the currents by convolving demodulated waveforms in synchronization with periodic alternating voltages applied to the transmitting electrodes 3 has been disclosed in another document. Note that, depending on the values of the transmission voltage matrix, the received current values may be negative values. Also, in this case, it is necessary to make consideration so that the reception circuit may not be saturated. As a specific method, for example, the reference voltage and power supply voltage in the current measurement unit 6 are set and adjusted to the values not to be saturated.

Further, in the current measurement unit 6, by subtraction of a value near the measurement value when the object as the target of detection does not approach as an offset, the change of the measurement value by the approach of the object can be measured more accurately. In this regard, the measurement value when the object as the target of detection does not approach is largely affected by the transmission voltage matrix T(t,n). Accordingly, subtraction of values different depending on the indexes t as offsets is performed. Furthermore, in the case where there is an influence of a contamination on the detection surface or the like, subtraction of values different depending on the mth receiving electrode 4 as an offset may be performed.

The values of the reception current matrix R(t,m) measured when multiline driving is performed are expressed by a matrix product of the transmission voltage matrix T(t,n) and an intersection coupling matrix P(n,m) as shown in Formula 1. Here, the intersection coupling matrix P(n,m) responds to the strengths of the electrostatic couplings of the respective intersections of the electrodes corresponding to the two-dimensional coordinates, and provides an assumption of values of the reception current matrix that would be obtained if the transmission voltage matrix performs line-sequential driving of the unit matrix. Note that the index n here is a row number of the matrix corresponding to the nth transmitting electrode 3, and the index m is a column number corresponding to the mth receiving electrode 4.

$$R(t,m)=T(t,n)P(n,m) \qquad \text{Formula 1}$$

This is because the currents by the electrostatic couplings are linear and the addition theorem holds. For example, it is assumed that the reception current flowing into the mth receiving electrode 4 when an alternating voltage of 1 V is applied to the n1th transmitting electrode 3 is R(n1,m) and the reception current flowing into the mth receiving electrode 4 when an alternating voltage of 1 V is applied to the n2th transmitting electrode 3 is R(n2,m). When an alternating voltage of 2 V is applied to the n1th transmitting electrode 3 and an alternating voltage of 3 V is applied to the n2th transmitting electrode 3 at the same time, the current as a sum of R(n1,m) multiplied by a factor of "2" and R(n2,m) multiplied by a factor of "3" flows in the mth receiving electrode 4.

Therefore, in the linear computing unit 7, as shown by Formula 2, the reception current matrix R(t,m) from the current measurement unit 6 is multiplied by an inverse matrix of the transmission voltage matrix T(t,n) from the left. Thereby, the matrix is converted into the intersection coupling matrix P(n,m) that would flow if the line-sequential driving is performed. Since the transmission voltage matrix is a regular matrix, the inverse matrix must exist. Formula 2 is obtained by multiplying both sides of Formula 1 by the inverse matrix of the transmission voltage matrix T(t,n) from the left and exchanging the right side and the left side.

$$P(n,m)=\{\text{Inverse Matrix of } T(t,n)\}R(t,m) \qquad \text{Formula 2}$$

Note that the inverse matrix of the transmission voltage matrix T(t,n) here may not necessarily be computed in each case, but typically, the inverse matrix computed in advance may be used.

Further, in the computation of the linear computing unit 7, multiplication of matrices is not necessarily performed. Computation is not necessary for the term in which the values of the elements of the inverse matrix of the transmission voltage matrix T(t,n) become "0", and simple addition and subtraction may be performed when the values of the elements are obtained by multiplication of "1" or "−1" by the same factor. That is, the computation of Formula 2 may be performed after all elements of the inverse matrix of the transmission voltage matrix T(t,n) are multiplied by the same factor. In this manner, all of the decimal elements are turned into integer numbers and the computation becomes easier. Especially, in the case where the absolute values of all elements except "0" are the same decimals, all elements are turned into "1", "0", or "−1" by factor multiplication and only simple addition and subtraction may be performed. In the proximity computing unit 8, proximity computation is performed not with absolute values but with relative values and the factor multiplication is characterized by hardly affecting the computation result. Accordingly, the factor multiplication of the respective elements into integer numbers is effective. In the subsequent explanation of formulae, it is not necessary to particularly bring the factors produced by the computation of the inverse matrix and the like into question.

It is noted that in the linear computing unit 7, as shown in FIG. 1, a memory unit 15 that stores the interim result of the computation is provided. The interim results once computed are stored in the memory unit 15 and the stored values are read out at plural times and utilized, and thereby, repetition and duplication of the same computation can be omitted. In this manner, the amount of computation in the linear computing unit 7 can be reduced and the computation time can be shortened. For example, in the case of using an Hadamard matrix for the transmission voltage matrix, fast Hadamard transform is performed.

Speeding up of linear computation in the case of the other transmission voltage matrices will be explained later in detail.

Note that the interim result of computation in the invention refers to values temporarily stored when values responding to the electrostatic capacitances of the respective intersections between the transmitting electrodes 3 and the receiving electrodes 4 are obtained from the values of the received currents measured in the current measurement unit 6 corresponding to the transmission voltage matrix. Accordingly, the interim result of the computation depends on the transmission voltage matrix and the values of the received currents. In the invention, the reduction of the amount of computation of linear computation is intended by particularly avoiding repetition of the same computation. Further, the invention is characterized in that the values once stored are read out at plural times and reused. Here, the values of received currents as the basis of linear computation and the values responding to the electrostatic capacitances of the respective intersections between the transmitting electrodes 3 and the receiving electrodes 4 as results of the linear computation are not contained as interim results of the computation.

When the values responding to the electrostatic capacitances of the respective intersections between the transmitting electrodes 3 and the receiving electrodes 4 are obtained from the values of the transmission voltage matrix, typically, the values responding to the electrostatic capacitances of the respective intersections are independently computed. However, in the invention, attention is focused on that completely the same computation may be performed partially when the values responding to the electrostatic capacitances of the other intersections, and the computation interim results are stored and read out at plural times. In the above described manner, the amount of computation is reduced by eliminating the duplication of computation, and the reduction in time and power consumption required for linear computation can be realized.

The computation of the linear computing unit 7 can be realized by logic circuits, processors, analog circuits, or the like.

The proximity computing unit 8 computes the approach and the position of the object as the target of detection from the intersection coupling matrix P(n,m) that would flow when the line-sequential driving is performed as current values depending on the electrostatic couplings of the respective intersections of the electrodes corresponding to the two-dimensional coordinates obtained in the linear computing unit 7 and their transition.

The control unit 9a manages the statuses and the sequences of the entire operation. The status here refers to statuses of during current measurement or the like, for example, and the sequence refers to procedures of ON and OFF of the current measurement. The control unit 9a includes the timing signal generating unit 40, an interval generating unit 41, and a power-save mode switching unit 42. Note that the interval generating unit 41 and the power-save mode switching unit 42 are added according to need.

A specific operation example using the proximity detection method according to the invention will be explained based on FIG. 5. This is an example of the case where driving and measurement for N rows of the transmission voltage matrix are collectively performed at a driving and measurement step 20 and then computation is performed at a computation step 30. The proximity detection method is started, and, at the driving and measurement step 20, driving is performed, currents are measured, and the reception current matrix is updated. For the purpose, the driving and measurement step 20 includes a multiline driving step 26 and a current measurement step 21 for measurement of reception currents. The multiline driving step 26 and the current measurement step 21 are performed nearly at the same time. Further, the multiline driving step 26 has a multiline waveform generation step 24 and a delay time adjustment step 25 according to need. By repeating update of the reception current matrix at N times of t=1 to N, a series of driving corresponding to all elements of the transmission voltage matrix is performed. Then, the computation step 30 is performed. The computation step 30 includes a linear computation step 22 and a proximity computation step 23. Linear computation is performed on the reception current matrix updated at the driving and measurement step 20 by the linear computation step 22, and the intersection coupling matrix is updated. Then, the approach and the position of the object as the target of detection is detected from values of the intersection coupling matrix updated at the linear computation step 22 or their transition by the proximity computation step 23 or their transition. By repeating the series of steps at a fixed frequency, the proximity detection method is realized. Note that this is an example and, during the linear computation step 22 and the proximity computation step 23, the next driving and measurement step 20 may be simultaneously performed by parallel processing or the like, for example.

In this manner, at the driving and measurement step 20, currents of the receiving electrodes 4 are measured at the current measurement step 21 while driving to the transmitting electrodes 3 is performed by the multiline driving step 26, and converted into digital values. In this regard, by repetition at N times while the number of times t of normal driving is from "1" to N, the series of driving corresponding to all elements in the transmission voltage matrix is performed.

Figure 4:
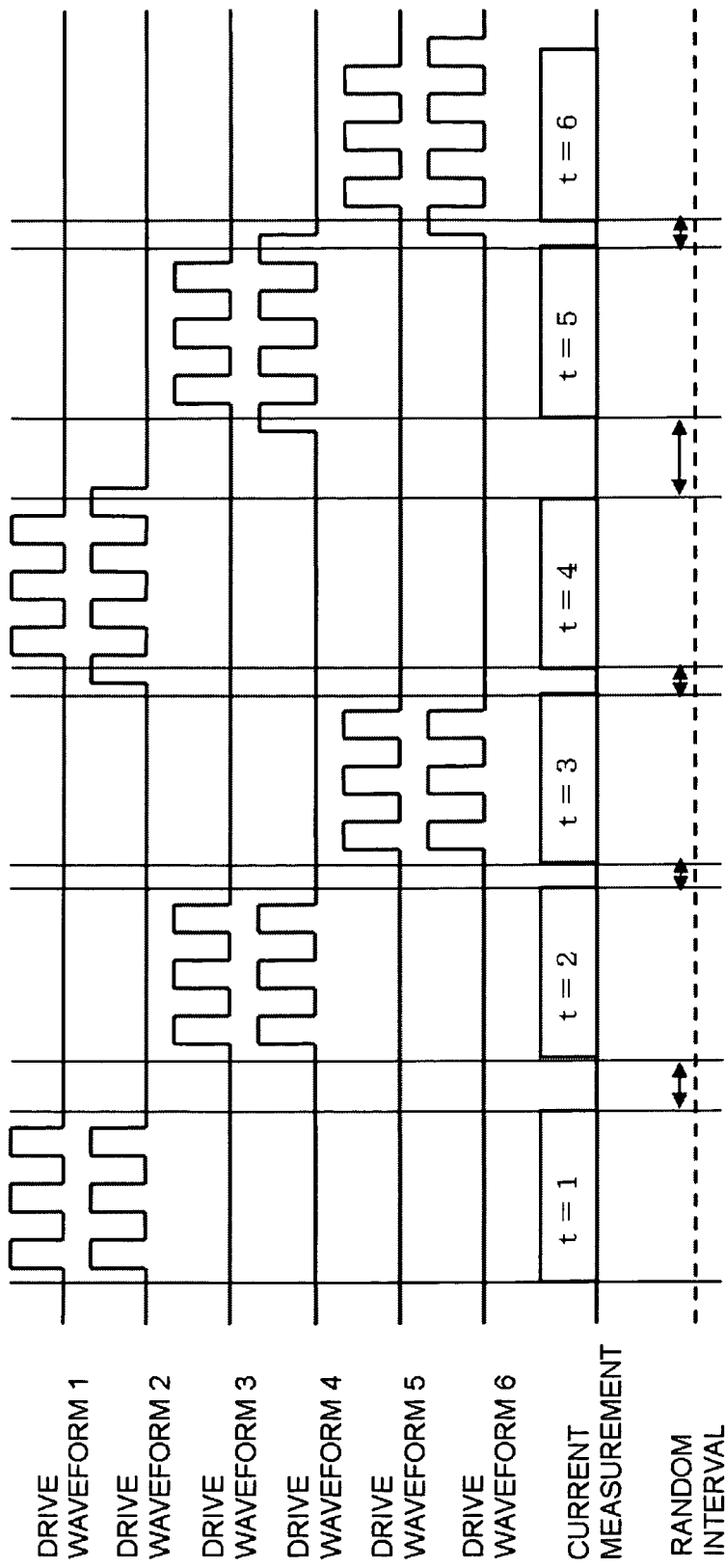
FIG. 4 is a timing chart of a driving and measurement step according to the invention.

FIG. 4 shows a more detailed specific timing chart of the driving of the transmitting electrodes 3 and the current measurement from the receiving electrodes 4.

In FIG. 4, drive waveforms show voltage waveforms of the respective transmitting electrodes 3, and, regarding the current measurement, timing of measuring alternating currents corresponding to the drive waveforms is shown. The random interval refers to insertion of random waiting times for making the influence of noise random, and arbitrary intervals may be inserted according to need between plural times of measurement of currents corresponding to the transmitting electrodes 3, for example. The horizontal axis is a time axis common to them. FIG. 4 shows six waveforms of drive waveform 1 to drive waveform 6 for convenience sake, however, this is schematic and the number of drive waveforms is N. For example, when current measurement is t=4 with drive waveform 1 and drive waveform 2, the drive waveform 1 applies 3 cycles of rectangular waves starting from rising and the drive waveform 2 applies 3 cycles of rectangular waves starting from falling with reversed polarity. Further, regarding the state of the current measurement t=5 of drive waveform 4 and the current measurement t=6 of drive waveform 6, 3 cycles of rectangular waves starting from falling with reversed polarity are applied, and, for other states, 3 cycles of rectangular waves starting from rising are applied. Their polarities respond to values of the respective elements of the transmission voltage matrix.

The timing in FIG. 4 is an example of the case where the matrix T expressed in Formula 13, which will be described later, as the transmission voltage matrix, and drive waveforms are sequentially applied to the respective transmitting electrodes 3 with polarities based on the values of the transmission voltage matrix. In the schematic chart, application of rectangular waves in one driving is performed in 3 cycles for convenience sake, however, it is obvious that the application is not limited to that. Note that driving to the transmitting electrodes 3 and current measurement of alternating currents from the receiving electrodes 4 are synchronized as is the case of the conventional line-sequential driving 35, and the current measurement values by the reversed driving are reversed in sign. The values of the reception current matrix are updated by the currents measured by the driving. By performing the series of driving corresponding to all elements of the transmission voltage matrix, all elements of the reception current matrix are also updated.

At the linear computation step 22, linear computation is performed on the reception current matrix updated at the current measurement step 21 by the linear computing unit 7, and the values of the intersection coupling matrix are updated. In this regard, as will be explained later in detail, the memory unit 15 is utilized for avoiding duplication of computation.

At the proximity computation step 23, the approach and the position of the object as the target of detection are detected by the proximity computing unit 8 from the values of the intersection coupling matrix updated at the linear computation step 22 or their transition.

Figure 6:
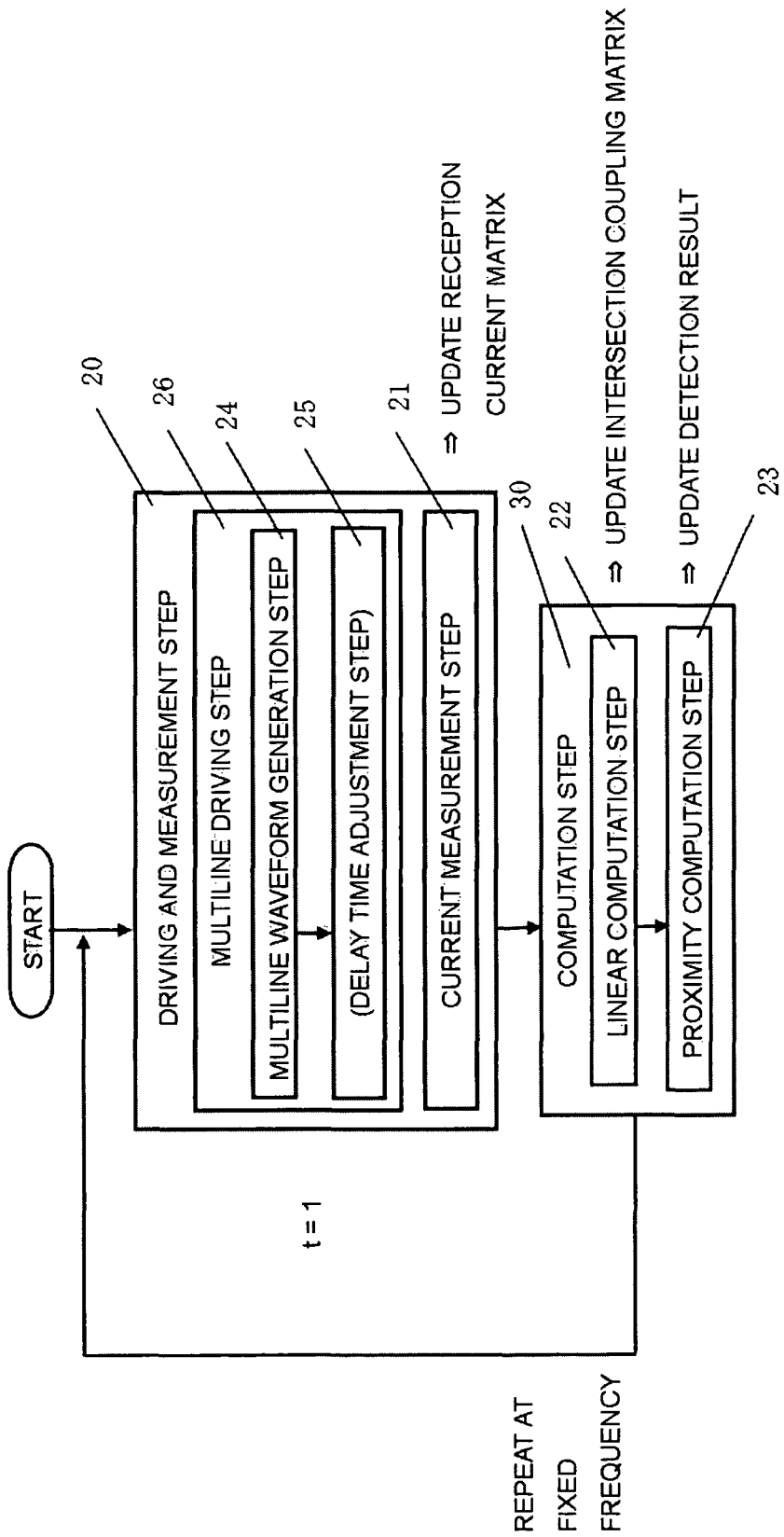
FIG. 6 is another process flow chart of the proximity detection method according to the invention.

Note that, in the case where the object as the target of detection has not approached yet and accurate position computation is not necessary, it is not necessarily required that driving to the transmitting electrodes 3 and the current measurement from the receiving electrodes 4 are performed with respect to all rows of the transmission voltage matrix. At the minimum, driving may be performed only on the rows of the transmission voltage matrix for driving all transmitting electrodes 3. In other words, driving may be performed on each column at least once. For example, in the case of using the transmission voltage matrix T shown in the above described Formula 13, all transmitting electrodes 3 are driven by performing driving only on the rows corresponding to t=1 to 3, and, in the case of using the transmission voltage matrix T shown in Formula 9, only one of the rows may be driven. That is, driving is performed at the smaller number of times of driving than the number of transmitting electrodes 3. In this case, it is only necessary to extract changes, and the linear computation step 22 may be omitted. The approach of the object can be detected by the proximity computing unit 8 if the object approaches any intersection, because there are usually some changes in the values of the reception current matrix. In this manner, the power consumption in waiting for the approach of the object can be made lower. This is the so-called power save. For example, in the case where all transmitting electrodes 3 are simultaneously driven, which will be described later, as shown in FIG. 6, it may be possible to only perform driving to the transmitting electrodes 3 and the current measurement from the receiving electrodes 4 with respect to one row of the transmission voltage matrix. Further, in the case of the transmission voltage matrix T shown in Formula 13, all transmitting electrodes 3 are driven by driving of the first three rows.

The procedures shown in FIG. 6 will be explained. In FIG. 6, there are nearly the same steps as those in FIG. 5. The difference is in the number of times of driving and measurement at the driving and measurement step 20. In this proximity detection method, for example, at each time when driving and measurement for one row of the transmission voltage matrix are performed, linear computation and proximity computation are performed based on the updated reception current matrix, and the operation is repeated in a fixed frequency. Thereby, the power-save mode is realized.

As above, the explanation has been made based on Formula 1 and Formula 2, however, it is obvious that the sequence of multiplication of the matrices using transposed matrices of the transmission voltage matrix T(t,n), the intersection coupling matrix P(n,m), and the reception current matrix R(t,m) may achieve the same result. In this case, Formula 3 corresponds to Formula 1 and Formula 4 corresponds to Formula 2. The calculation processing is performed at the linear computation step 22 by the linear computing unit 7.

$$R^T(m,t) = P^T(m,n)T^T(n,t) \quad \text{Formula 3}$$

$$P^T(m,n) = R(m,t)\{\text{Inverse Matrix of } T^T(n,t)\} \quad \text{Formula 4}$$

Note that, as above, the example of the case where the alternating currents in response to the alternating voltage waveforms of the transmitting electrodes 3 and the electrostatic capacitances of the intersections between the transmitting electrodes 3 and the receiving electrodes 4 are measured in the current measurement unit 6 has been shown, however, in the current measurement unit 6, values in response to the amounts of charge flowing in proportion to the electrostatic capacitances of the intersections between the transmitting electrodes 3 and the receiving electrodes 4 when the step-like voltage changes are applied to the transmitting electrodes 3 may be measured. In this case, given that the voltage change including polarity of the nth transmitting electrode 3 is V(t,n) corresponding to the transmission voltage matrix T(t,n), the electrostatic capacitance of the intersection between the nth transmitting electrode 3 and the mth receiving electrode 4 corresponding to the intersection coupling matrix P(n,m) is C(n,m), the amount of charge flowing in the mth receiving electrode 4 corresponding to the reception current matrix R(t,m) measured in the current measurement unit is Q(t,m), and the number of times of the voltage change of the transmitting electrode 3 for measurement of the amount of charge is "1", Formula 5 and Formula 6 hold. Formula 6 is used for conversion into the electrostatic capacitances of the intersections corresponding to the intersection coupling matrix by the linear computing unit 7 and the linear computation step 22.

$$Q(t,m) = 1 \cdot V(t,n)C(n,m) \quad \text{Formula 5}$$

$$C(n,m) = \{\text{Inverse Matrix of } V(t,n)\}Q(t,m)/1 \quad \text{Formula 6}$$

These Formula 5 and Formula 6 correspond to Formula 1 and Formula 2. Further, regarding Formula 5 and Formula 6, as shown in Formula 7 and Formula 8, it is obvious that the sequence of multiplication of the matrices using transposed matrices may achieve the same result.

$$Q^T(m,t) = 1 \cdot C^T(m,n)V^T(n,t) \quad \text{Formula 7}$$

$$C^T(m,n) = Q^T(m,t)\{\text{Inverse Matrix of } V^T(n,t)\}/1 \quad \text{Formula 8}$$

As below, relationships between the values of the respective elements of the transmission voltage matrix T(t,n) and effects as a feature of the invention will be explained. As described above, it is necessary that the transmission voltage matrix is a regular matrix having an inverse matrix. Further, it is desirable that the values of the elements of the transmission voltage matrix T(t,n) are obtained by multiplication of "1", "0", or "−1" by the same factor for the simpler drive circuit. Furthermore, for simpler linear computation, it is desirable that the elements of the inverse matrix are integer numbers multiplied by the same factor, specifically, "1", "0", or "−1" multiplied by the same factor. In addition, when the transmission voltage matrix is an orthogonal matrix, the power supply voltage can efficiently be made smaller. The orthogonal matrix here is a matrix whose product of a transposed matrix and itself becomes a factor multiplication of a unit matrix.

As a matrix that satisfies these conditions, for example, Hadamard matrix is known. The Hadamard matrix is a square matrix in which elements are "1" or "−1" and the respective rows are orthogonal to each other.

As an example of the first transmission voltage matrix, the case where all transmitting electrodes 3 are simultaneously driven by the Hadamard matrix will be explained. Note that, for convenience of explanation, the case of using the Hadamard matrix of 8 rows and 8 columns according to the Sylvester's construction method shown in Formula 9 will be explained here, however, not limited to that. Also, note that, in the following examples, the feature will be explained using relatively small matrices for convenience sake, however, not limited to that, either.

$$T(t,n) = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad \text{Formula 9}$$

$$T^{-1}(n,t) = \frac{1}{8} \cdot T(n,t)$$

In this case, compared to the case of the conventional line-sequential driving, the number of driving times is eight-fold for the respective electrodes, and, when the driving is performed at the same voltage, the eightfold power consumption is necessary for driving. However, in the inverse matrix of the transmission voltage matrix multiplied in the case where intersection coupling matrix P(n,m) is obtained, the magnitudes of the respective elements become one-eighth. By the one-eighth computation, the magnitude of noise becomes one-eighth. Accordingly, the strength of the combined noise of eight times of driving is obtained by the square-root of sum of squares when the noise is random, and thus, given that the strength of the noise at line-sequential driving is "1", as shown in Formula 10, it becomes about 0.35-fold. Alternatively, it may be considered that the noise becomes about 0.35-fold by averaging of the eight measurement values. In this manner, in the case of using the orthogonal matrix, the noise can be attenuated in proportion to the reciprocal of the square-root of the number of simultaneously driven transmitting electrodes 3.

$$\text{Ratio of Combined Noise} = \frac{\sqrt{8 \text{ times} \times \left(\frac{1}{8} \text{ fold}\right)^2}}{\sqrt{1 \text{ time} \times 1 \text{ fold}^2}} = \frac{1}{\sqrt{8}} \approx 0.35 \quad \text{Formula 10}$$

Further, in the case of using the same S/N-ratio as that in the case of the conventional line-sequential driving, the strength of the signal is proportional to the voltage of driving, and thus, the power supply voltage can be made as small as about 0.35-fold. Here, since the power consumption necessary for driving is considered to be proportional to the square of the power supply voltage, even when the number of driving times becomes eight-fold, the power consumption can be suppressed to nearly the same. Further, in consideration of the size of a boosting circuit, the boosting power efficiency, the withstand voltage of the drive circuit, or the like, the merit of largely reduced driving voltage is significant. Alternatively, by simultaneously driving the plural transmitting electrodes 3, for example, at driving with the same power supply voltage, the number of cycles of the alternating voltages output from the multiline driving unit 5 for driving can be reduced, and the detection speed can be made higher.

As described above, in the case where the transmission voltage matrix is an Hadamard matrix according to the Sylvester's construction method, the fast Hadamard transform as shown in Formula 11 can be used for linear computation of inverse matrix multiplication in the linear computing unit 7 and the linear computation step 22 with respect to each receiving electrode m.

$$M11 = R1 + R2 \quad M21 = M11 + M12 \quad P1 = M21 + M22$$
$$M12 = R3 + R4 \quad M22 = M13 + M14 \quad P2 = M23 + M24$$
$$M13 = R5 + R6 \quad M23 = M15 + M16 \quad P3 = M25 + M26$$
$$M14 = R7 + R8 \quad M24 = M17 + M18 \quad P4 = M27 + M28$$
$$M15 = R1 - R2 \quad M25 = M11 - M12 \quad P5 = M21 - M22$$
$$M16 = R3 - R4 \quad M26 = M13 - M14 \quad P6 = M23 - M24$$
$$M17 = R5 - R6 \quad M27 = M15 - M16 \quad P7 = M25 - M26$$
$$M18 = R7 - R8 \quad M28 = M17 - M18 \quad P8 = M27 - M28$$

Formula 11

The fast Hadamard transform in the invention is not necessarily the same one as general Hadamard transform, and refers to a method, in the case where an Hadamard matrix is multiplied by values of received currents different depending on the drive pattern of the transmitting electrodes 3, of storing the interim result of the computation in the memory unit 15 of the linear computing unit 7, reducing the amount of computation by reading out the stored values at plural times, and converting the values into values responding to the electrostatic capacitances of the respective intersections between the transmitting electrodes 3 and the receiving electrodes 4 at a high speed.

For example, by storing the results of computation processing in heavy use in advance as in Formula 11, compared to the case of Formula 12 without using the fast Hadamard transform, the amount of computation is reduced and the time for linear computation is shortened. In Formula 11, Rt (t is an index) is a reception value of a certain receiving electrode 4 at time t, Pn (n is an index) corresponds to the electrostatic capacitance of the intersection between the nth transmitting electrode 3 and receiving electrode 4. Here, Mij (i, j are indexes) is data stored in the memory unit 15, and an element necessary when the fast Hadamard transform is performed. The index i is an integer number from "1" to ($\log_2 N-1$), and the index j is an integer number from "1" to N. For example, in the case of N=8, data are expressed by M11 to M18, M21 to M28, and stored in the memory unit 15 shown in FIG. 1. Note that, even in the case where N is larger, in practice, the value of M1j is unnecessary after the computation of M2j is finished, and the memory part of M1j may be used as a memory part of M3j. That is, only memory parts for odd numbers and even numbers as values of i are necessary and capacitances of them are enough for storing twice the values of N.

$$P1 = R1 + R2 + R3 + R4 + R5 + R6 + R7 + R8$$
$$P2 = R1 - R2 + R3 - R4 + R5 - R6 + R7 - R8$$
$$P3 = R1 + R2 - R3 - R4 + R5 + R6 - R7 - R8$$
$$P4 = R1 - R2 - R3 + R4 + R5 - R6 - R7 + R8$$
$$P5 = R1 + R2 + R3 + R4 - R5 - R6 - R7 - R8$$
$$P6 = R1 - R2 + R3 - R4 - R5 + R6 - R7 + R8$$
$$P7 = R1 + R2 - R3 - R4 - R5 - R6 + R7 + R8$$
$$P8 = R1 - R2 - R3 + R4 - R5 + R6 + R7 - R8$$

Formula 12

The index i of M corresponds to the order of computation in the fast Hadamard transform, and the computation is first performed from M1j for i=1 and the computation of Pj is finally performed. N computations with respect to each i and P are performed by computing sums with respect to each of adjacent N/2 set, and then, computing subtraction.

Typically, in the case of multiplication of an Hadamard matrix of kth power of two according to the Sylvester's construction method, when computation is performed on one receiving electrode 4, addition and subtraction at the number of times of the product of kth power of two and kth power of two minus "1" are necessary as shown by the example of the case where k is "3" in Formula 12, for example. Using the fast Hadamard transform, the number of times is the product of kth power of two and k. Therefore, the effect of reduction in the amount of computation is greater as the number of rows or columns of the Hadamard matrix is larger.

Further, the computation formula is not limited to that, however, any computation may be performed as long as the same result may finally be obtained. For example, the same result is obtained by reversing the addition and subtraction of M28 when P4 and P8 are computed by obtaining M28 by subtracting M17 from M18. It is obvious that the way of thinking is the same in the subsequent formulae.

Note that, in order to make the phase relation to the periodic noise produced at each driving random, as shown in FIG. 4, random intervals may be inserted between the respective drivings so that the phase relation of the alternating voltages at each driving may not be constant.

Here, in the case of Hadamard matrix according to the Sylvester's construction method, since the size is power of two, the matrix is limited for the case where the number of transmitting electrodes 3 is the power of two. In the example of the second transmission voltage matrix shown in Formula 13 as below, the number of transmitting electrodes 3 is not limited to the power of two, and a larger transmission voltage matrix is formed by inserting smaller Hadamard matrices according to the Sylvester's construction method in diagonal elements. For example, the case where a 6-row and 6-column transmission voltage matrix is formed by inserting three 2-row and 2-column Hadamard matrices in diagonal elements is shown in Formula 13. Note that, in order to improve the synchronism of detection between electrodes by shortening the period of driving, as shown in Formula 13, the transmission voltage matrix in which rows are rearranged may be used. Further, rearrangement of columns may not particularly be problematic.

$$\text{Matrix before Rearrangement} = \begin{bmatrix} 1 & 1 & 0 & 0 & 0 & 0 \\ 1 & -1 & 0 & 0 & 0 & 0 \\ 0 & 0 & 1 & 1 & 0 & 0 \\ 0 & 0 & 1 & -1 & 0 & 0 \\ 0 & 0 & 0 & 0 & 1 & 1 \\ 0 & 0 & 0 & 0 & 1 & -1 \end{bmatrix}$$

Formula 13

$$T(t,n) = \begin{bmatrix} 1 & 1 & 0 & 0 & 0 & 0 \\ 0 & 0 & 1 & 1 & 0 & 0 \\ 0 & 0 & 0 & 0 & 1 & 1 \\ 1 & -1 & 0 & 0 & 0 & 0 \\ 0 & 0 & 1 & -1 & 0 & 0 \\ 0 & 0 & 0 & 0 & 1 & -1 \end{bmatrix}$$

$$T^{-1}(n,t) = \frac{1}{2} \cdot \begin{bmatrix} 1 & 0 & 0 & 1 & 0 & 0 \\ 1 & 0 & 0 & -1 & 0 & 0 \\ 0 & 1 & 0 & 0 & 1 & 0 \\ 0 & 1 & 0 & 0 & -1 & 0 \\ 0 & 0 & 1 & 0 & 0 & 1 \\ 0 & 0 & 1 & 0 & 0 & -1 \end{bmatrix} = \frac{1}{2} \cdot T^T(n,t)$$

In this example, as is the case of the example of the case of Formula 9, while the same S/N-ratio as that of the conventional line-sequential is kept, the power supply voltage can be made smaller to the reciprocal-fold of the square root of two, i.e., about 0.71-fold. The power consumption in this case is nearly the same as that in the case of line-sequential driving. Alternatively, the detection speed may be made similarly higher.

As described above, the cases where the Hadamard matrix according to the Sylvester's construction method itself is used and only the Hadamard matrix according to the Sylvester's construction method is used for the submatrix have been shown, and further, the case where an example in which matrices formed by multiplying the respective elements of the 2-row and 2-column Hadamard matrix according to the Sylvester's construction method by "−1" and the right and left columns are exchanged are added to start from the first column in the fourth row, the third column in the sixth row, and the fifth column in the second row is shown in Formula 14.

$$T(t,n) = \begin{bmatrix} 1 & 1 & 1 & -1 & 0 & 0 \\ 1 & -1 & 0 & 0 & -1 & -1 \\ 0 & 0 & 1 & 1 & 1 & -1 \\ -1 & -1 & 1 & -1 & 0 & 0 \\ 1 & -1 & 0 & 0 & 1 & 1 \\ 0 & 0 & -1 & -1 & 1 & -1 \end{bmatrix} \quad \text{Formula 14}$$

$$T^{-1}(n,t) = \frac{1}{4} \cdot \begin{bmatrix} 1 & 1 & 0 & -1 & 1 & 0 \\ 1 & -1 & 0 & -1 & -1 & 0 \\ 1 & 0 & 1 & 1 & 0 & -1 \\ -1 & 0 & 1 & -1 & 0 & -1 \\ 0 & -1 & 1 & 0 & 1 & 1 \\ 0 & -1 & -1 & 0 & 1 & -1 \end{bmatrix} = \frac{1}{4} \cdot T^T(n,t)$$

In this example, it is unnecessary that the number of transmitting electrodes 3 is the power of two, and four transmitting electrodes 3 are simultaneously driven. Accordingly, the power supply voltage and the detection speed are further improved than in the case of Formula 13.

As another method of obtaining the transmission voltage matrix of Hadamard matrix of the nonexistent size, a submatrix of larger Hadamard matrix may be used. For example, as a 7-row and 7-column transmission voltage matrix, a transmission voltage matrix shown in Formula 15 is obtained as a submatrix formed by removing the first row and the eighth column of an 8-row and 8-column Hadamard matrix, for example.

Note that, in the case where the number of transmitting electrodes 3 is an odd number and the elements are "1" or "−1", the inner product is never zero nor orthogonal, and crosstalk occurs even when the correlations are computed as in the related art. Still, using the inverse matrix as shown in Formula 15, values responding to the electrostatic capacitances of the respective intersections between the transmitting electrodes 3 and the receiving electrodes 4 can be obtained without crosstalk.

Further, in this case, the matrix is not an orthogonal matrix and, even when seven transmitting electrodes 3 are simultaneously driven, only the same effect as that in the case of averaging four times of measurement is obtained. Despite this, compared to the line-sequential driving, the effect of shortening the detection speed to four-fold when the driving is performed at the same voltage, for example, is great. The four times of measurement here corresponds to the four elements not zero in the respective rows of the inverse matrix of T shown by Formula 15 for obtaining the values of the respective elements of the intersection coupling matrix at the linear computation step 22. That is, the transmitting electrodes 3 are driven at seven times and the electrostatic capacitances of the respective intersection couplings are determined by the predetermined four times of measurement of them.

$$T(t,n) = \begin{bmatrix} 1 & -1 & 1 & -1 & 1 & -1 & 1 \\ 1 & 1 & -1 & -1 & 1 & 1 & -1 \\ 1 & -1 & -1 & 1 & 1 & -1 & -1 \\ 1 & 1 & 1 & 1 & -1 & -1 & -1 \\ 1 & -1 & 1 & -1 & -1 & 1 & -1 \\ 1 & 1 & -1 & -1 & -1 & -1 & 1 \\ 1 & -1 & -1 & 1 & -1 & 1 & 1 \end{bmatrix} \quad \text{Formula 15}$$

$$T^{-1}(n,t) = \frac{1}{4} \cdot \begin{bmatrix} 1 & 1 & 0 & 1 & 0 & 0 & 1 \\ 0 & 1 & -1 & 1 & -1 & 0 & 0 \\ 1 & 0 & -1 & 1 & 0 & -1 & 0 \\ 0 & 0 & 0 & 1 & -1 & -1 & 1 \\ 1 & 1 & 0 & 0 & -1 & -1 & 0 \\ 0 & 1 & -1 & 0 & 0 & -1 & 1 \\ 1 & 0 & -1 & 0 & -1 & 0 & 1 \end{bmatrix}$$

Note that, in the case of using the Hadamard matrix according to the Sylvester's construction method shown in Formula 9, since the polarities of all transmitting electrodes 3 are the same when the first row is driven, if the finger does not approach, the combined current flowing in the receiving electrodes 4 becomes larger and easier to be saturated in the current measurement unit 6. When the absolute value of the total value of the currents applied to the rows of the transmission voltage matrix is large, it is easier to be saturated in the current measurement unit 6. In the case of the Hadamard matrix shown in Formula 9, the total value in the first row is "8" and the total values of the other rows are "0". If the gain of the current measurement unit 6 is lowered to avoid the saturation, the resolution of the detection may be reduced or the influence of the noise on the current measurement unit 6 may be relatively larger.

Accordingly, to avoid saturation without lowering the gain of the current measurement unit 6, by factor multiplication is performed with respect to each column of the transmission voltage matrix T, the reception currents when the finger does not approach are made smaller so that the saturation in the current measurement unit 6 may not occur. Further, to equalize the polarities of the total values of the rows, factor multiplication may be performed with respect to each row. For example, using the transmission voltage matrix T in which the second column, the third column, and the fifth row of the Hadamard matrix according to the Sylvester's construction method shown in Formula 9 are multiplied by "−1" shown in Formula 16, the maximum absolute value of the total values of the rows becomes "4", and the maximum value of the currents of the receiving electrodes 4 when the finger does not approach can be suppressed to about a half of the Hadamard matrix according to the Sylvester's construction method shown in Formula 9. The inverse matrix in this case is obtained by dividing the transposed matrix of the transmission voltage matrix by "8".

$$T(t,n) = \begin{bmatrix} 1 & -1 & -1 & 1 & 1 & 1 & 1 & 1 \\ 1 & 1 & -1 & -1 & 1 & -1 & 1 & -1 \\ 1 & -1 & 1 & -1 & 1 & 1 & -1 & -1 \\ 1 & 1 & 1 & 1 & 1 & -1 & -1 & 1 \\ -1 & 1 & 1 & -1 & 1 & 1 & 1 & 1 \\ 1 & 1 & -1 & -1 & -1 & 1 & -1 & 1 \\ 1 & -1 & 1 & -1 & -1 & -1 & 1 & 1 \\ 1 & 1 & 1 & 1 & -1 & 1 & 1 & -1 \end{bmatrix} \quad \text{Formula 16}$$

$$\sum(t) = \begin{bmatrix} 4 \\ 0 \\ 0 \\ 4 \\ 4 \\ 4 \\ 0 \\ 0 \\ 4 \end{bmatrix}$$

$$T^{-1}(n,t) = \frac{1}{8} \cdot T^T(n,t)$$

Note that, to utilize the fast Hadamard transform for the computation of the inverse matrix in the linear computing unit 7 with respect to each receiving electrode m, in the case where the column n of the transmission voltage matrix is multiplied by "−1", the corresponding result P(n,m) of the fast Hadamard transform may be multiplied by "−1", and, in the case where the row m of the transmission voltage matrix is multiplied by "−1", the corresponding reception values P(t,m) of the receiving electrodes 4 may be multiplied by "−1" and fast-Hadamard-transformed. For example, as shown in Formula 16, in the case where the Hadamard matrix is improved by multiplying the second column, the third column, and the fifth row by "−1", as shown in Formula 17, negative signs may be assigned to R5, P2, and P3.

$$\begin{aligned} M11 &= R1 + R2 & M21 &= M11 + M12 & P1 &= M21 + M22 \\ M12 &= R3 + R4 & M22 &= M13 + M14 & P2 &= -(M23 + M24) \\ M13 &= -R5 + R6 & M23 &= M15 + M16 & P3 &= -(M25 + M26) \\ M14 &= R7 + R8 & M24 &= M17 + M18 & P4 &= M27 + M28 \end{aligned} \quad \text{Formula 17}$$

-continued
$$\begin{aligned} M15 &= R1 - R2 & M25 &= M11 - M12 & P5 &= M21 - M22 \\ M16 &= R3 - R4 & M26 &= M13 - M14 & P6 &= M23 - M24 \\ M17 &= -R5 - R6 & M27 &= M15 - M16 & P7 &= M25 - M26 \\ M18 &= R7 - R8 & M28 &= M17 - M18 & P8 &= M27 - M28 \end{aligned}$$

Note that, here, the case where the second column, the third column, and the fifth row are multiplied by "−1" is shown, however, not limited to that, but any row or column of the Hadamard matrix may be multiplied by "−1" as long as the range of the total values of the rows is small. These factors may be easily obtained by allowing a program to determine that they make the absolute value of the total value of the respective rows small with respect to all combinations of "1" or "−1" of the column factors, for example, and multiplying the rows with the negative total values of the respective rows by "−1". Alternatively, by focusing attention on the rows with the large absolute value of the total value of the respective rows and changing the column factors to making the values smaller, desirable factors can easily be obtained faster.

Regarding the way to determine the transmission voltage matrix, the cases where the number of transmitting electrodes 3 is small have been explained for convenience sake by taking the examples, however, it is obvious that the transmission voltage matrix can be determined in the same way even when the number of transmitting electrodes 3 becomes larger.

As described above, the method of determining the transmission voltage matrix based on the Hadamard matrix has been explained. However, using this method, in the case where the submatrix of the Hadamard matrix as shown in Formula 15 is used, for example, it is difficult to execute fast computation of the inverse matrix in the linear computing unit 7 because the inverse matrix has completely different elements from those of the Hadamard matrix. In order to solve the problem, the inverse matrix used in the linear computing unit 7 may be the submatrix of the Hadamard matrix, and the transmission voltage matrix may be an inverse matrix of the inverse matrix used in the linear computing unit 7. For the purpose, the problem may be solved by exchanging the transmission voltage matrix of Formula 15 and its inverse matrix, for example.

For example, in the example of Formula 18, the inverse matrix of the transmission voltage matrix T used in the linear computing unit 7 is obtained by multiplying the second row of a submatrix formed by removing the first row and the eighth column of an 8-row and 8-column Hadamard matrix according to the Sylvester's construction method by "−1". In this case, the transmission voltage matrix T is determined by computing an inverse matrix of the inverse matrix used in the linear computing unit 7. This is because an inverse matrix of the inverse matrix is identical with the original matrix.

$$T(t,n) = \begin{bmatrix} 1 & -1 & 0 & 1 & 0 & 0 & 1 \\ 0 & -1 & -1 & 1 & -1 & 0 & 0 \\ 1 & 0 & -1 & 1 & 0 & -1 & 0 \\ 0 & 0 & 0 & 1 & -1 & -1 & 1 \\ 1 & -1 & 0 & 0 & -1 & -1 & 0 \\ 0 & -1 & -1 & 0 & 0 & -1 & 1 \\ 1 & 0 & -1 & 0 & -1 & 0 & 1 \end{bmatrix} \quad \text{Formula 18}$$

$$\sum(t) = \begin{bmatrix} 2 \\ -2 \\ 0 \\ 0 \\ -2 \\ -2 \\ 0 \end{bmatrix}$$

$$T^{-1}(n,t) = \frac{1}{4} \cdot \begin{bmatrix} 1 & -1 & 1 & -1 & 1 & -1 & 1 \\ -1 & -1 & 1 & 1 & -1 & -1 & 1 \\ 1 & -1 & -1 & 1 & 1 & -1 & -1 \\ 1 & 1 & 1 & 1 & -1 & -1 & -1 \\ 1 & -1 & 1 & -1 & -1 & 1 & -1 \\ 1 & 1 & -1 & -1 & -1 & -1 & 1 \\ 1 & -1 & -1 & 1 & -1 & 1 & 1 \end{bmatrix}$$

In this manner, the transmission voltage matrix T and its inverse matrix are determined, and thereby, the fast Hadamard transform can be applied to the computation in the linear computing unit 7. That is, regarding the transmitting electrodes n corresponding to the rows eliminated from the Hadamard matrix according to the Sylvester's construction method when the inverse matrix is obtained in the linear computing unit 7, values P(n,m) responding to the electrostatic capacitances of the intersections with the receiving electrodes m do not exist. Further, the reception values R(t,m) with respect to the time t corresponding to the columns eliminated from the Hadamard matrix do not exist, neither. Furthermore, the correspondence when the rows and columns having submatrices are multiplied by "−1" is the same as the relationship between the above described Formula 16 and Formula 17.

For example, an example of the case of the transmission voltage matrix according to the above described Formula 18 is shown in Formula 19. In response to the elimination of the first row of the Hadamard matrix when the inverse matrix of the transmission voltage matrix is determined, the part of the computation for obtaining P1 of Formula 11 becomes unnecessary, and P2 to P8 in Formula 11 are shifted one by one, and correspond to P1 to P7 in Formula 19. Further, in response to the elimination of the eighth column of the Hadamard matrix, R8 does not exist. Furthermore, in response to the multiplication of the second row of the submatrix of the Hadamard matrix by "−1", the value of P2 is multiplied by "−1".

$M11 = R1 + R2 \quad M21 = M11 + M12$ Formula 19

$M12 = R3 + R4 \quad M22 = M13 + M14 \quad P1 = M23 + M24$ $M13 = R5 + R6 \quad M23 = M15 + M16 \quad P2 = -(M25 + M26)$ $M14 = R7 \quad\quad\quad M24 = M17 + M18 \quad P3 = M27 + M28$ $M15 = R1 - R2 \quad M25 = M11 - M12 \quad P4 = M21 - M22$ $M16 = R3 - R4 \quad M26 = M13 - M14 \quad P5 = M23 - M24$ $M17 = R5 - R6 \quad M27 = M15 - M16 \quad P6 = M25 - M26$ $M18 = R7 \quad\quad\quad M28 = M17 - M18 \quad P7 = M27 - M28$ It is confirmed that these computations are correct because results obtained from the computation that the inverse matrix of the transmission voltage matrix T of Formula 18 is substituted into Formula 2 and the computation that Formula 19 is applied to the respective receiving electrodes m are equal.

Further, the transmission voltage matrix T and its inverse matrix have been explained, however, the column V indicating the voltage changes and its inverse matrix may be the same.

Note that the transmission voltage matrix, the reception current matrix, and the intersection coupling matrix that have been explained are abstract representation for convenience sake, and it is obvious that the matrices are specifically realized by plural memory devices or computing unit 10a.

As shown above, according to the invention, by determining the transmission voltage matrix by carrying out operations of factor multiplication of submatrix and arbitrary rows and columns based on the Hadamard matrix and using their inverse matrices, in multiline driving for improving the detection efficiency by simultaneously driving the plural transmitting electrodes 3, a proximity detection device and method that can perform detection without crosstalk at a high detection speed can be realized.

Regarding the embodiment in the case where the inverse matrix of the transmission voltage matrix is computed by the linear computation according to the invention, the method of efficiently speeding up by applying the fast Hadamard transform has been explained in detail, however, the method of obtaining the values responding to the electrostatic capacitances of the respective intersections between the transmitting electrodes 3 and the receiving electrodes 4 from the values of received currents at a higher speed by storing the interim results of the computation is not limited to that. For example, the speeding up of computation according to the invention is similarly used when the values responding to the electrostatic capacitances of the respective intersections between the transmitting electrodes 3 and the receiving electrodes 4 are obtained by the correlation computation in the related art. That is, the common interim results of computation are stored in the memory unit 15 and read out at plural times, and thereby, the amount of computation can be reduced. Note that, in the correlation computation, since the amount of duplication of computation is typically small, and the amount of computation is not more efficiently reduced compared to the inverse matrix computation of the transmission voltage matrix to which the fast Hadamard transform is applied.

Figure 7A:
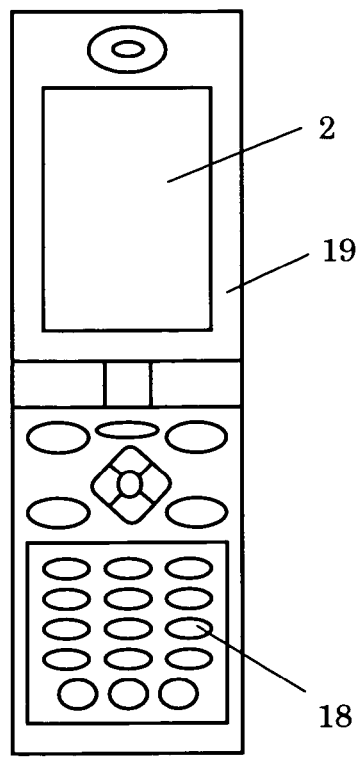
FIGS. 7A through 7D show an example of information equipment using the invention.
Figure 7B:
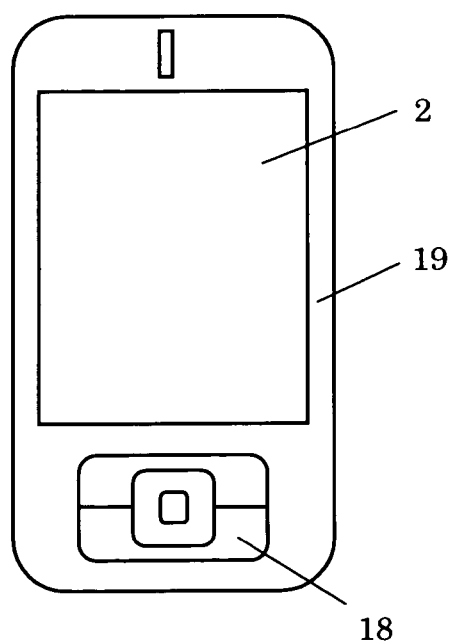
Figure 7C:
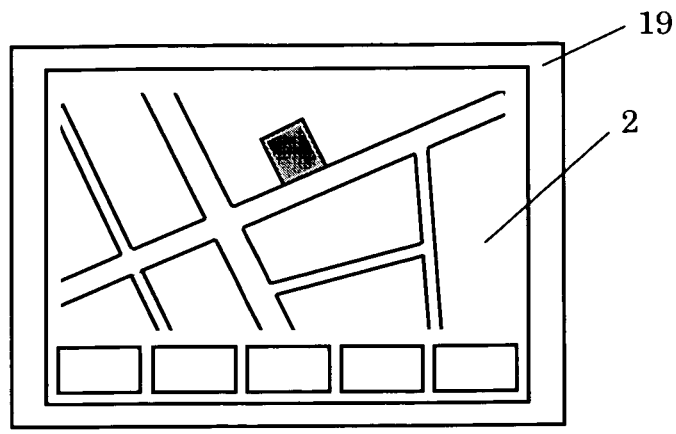
Figure 7D:
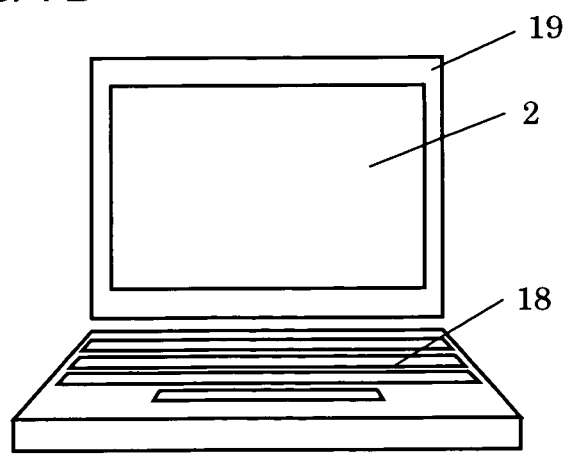
Figure 8:
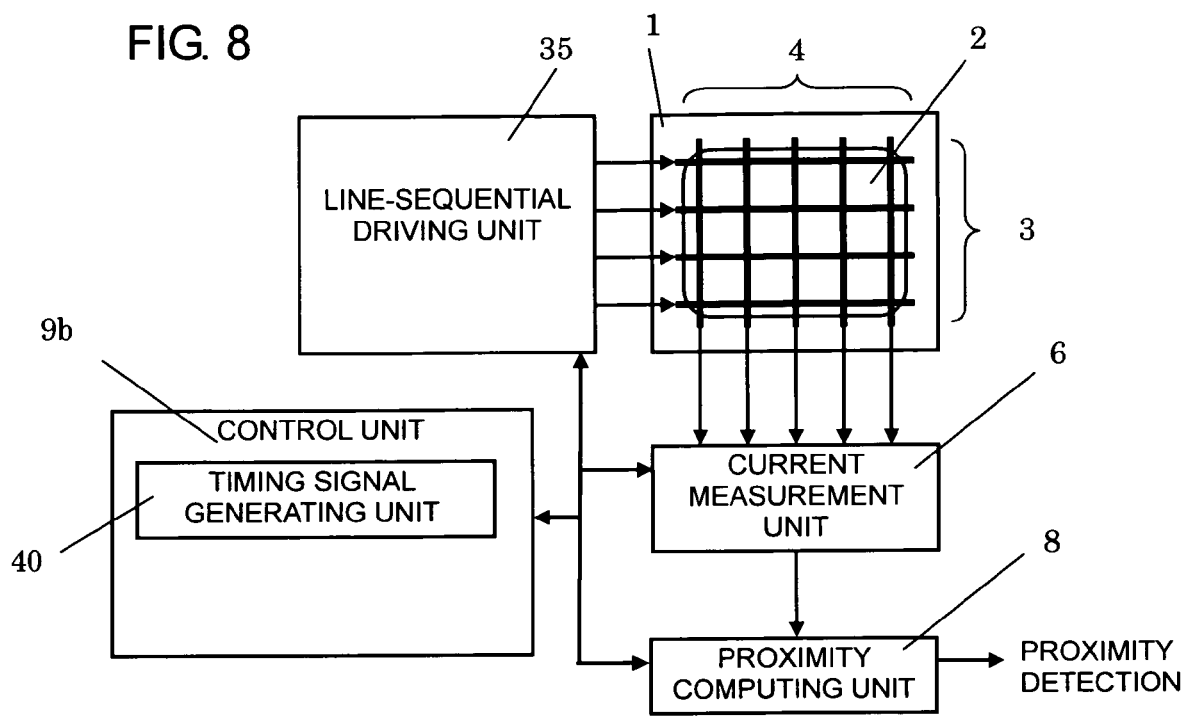
FIG. 8 is a block diagram of a conventional proximity detection device.

Further, according to the proximity detection device and the proximity detection method according to the invention, by superimposing a transparent detection panel on a display device of a cellular phone as shown in FIG. 7A, a multimedia player as shown in FIG. 7B, a navigation system as shown in FIG. 7C, a computer as shown in FIG. 7D, or the like, information equipment such as portable instruments and computers that can perform stable smooth operation resistant to noise can be constructed.

A configuration of the information equipment shown in FIGS. 7A to 7D includes a case 19 that protects the information equipment, a display that outputs information, the proximity detection device of the invention that receives the input from the detection area 2 set on the display and determines the approach and the location of the object, and a CPU that controls an input from the proximity detection device, and the output to the display. Further, as shown in FIGS. 7A, 7B, and 7D, a keyboard 18 may be added to the information equipment.

What is claimed is:

1. A proximity detection device for detecting an approach and/or a position of an object, the proximity detection device comprising:

plural transmitting electrodes corresponding to one of two dimensions in a detection area on a supporting unit and receiving electrodes corresponding to the other of the two dimensions of the detection area;

a multiline driving unit that simultaneously applies periodic alternating voltages to at least two electrodes of the transmitting electrodes to drive the at least two transmitting electrodes;

a current measurement unit that measures current values or amounts of accumulated charge from the receiving electrodes in synchronization with driving of the at least two transmitting electrodes;

a computing unit that calculates the approach and/or the position of the object toward the detection area by converting the current values or the amounts of accumulated charge measured by the current measurement unit into values in response to electrostatic capacitances of respective intersections between the transmitting electrodes and the receiving electrodes; and a control unit that manages statuses and sequences of the multiline driving unit, the current measurement unit, and the computing unit, wherein the computing unit includes:

a linear computing unit that performs linear computation to convert the current values or the amounts of accumulated charge measured by the current measurement unit into values in response to the electrostatic capacitances of the respective intersections between the transmitting electrodes and the receiving electrodes, and a proximity computing unit that computes the approach and/or the position of the object toward the detection area from an output of the linear computing unit, and wherein the linear computing unit includes a memory unit that stores an interim result of the linear computation performed by the linear computing unit so as to allow the interim result to be read out at plural times.

2. The proximity detection device according to claim 1, wherein the linear computing unit performs a fast Hadamard transform or a transform equal to the fast Hadamard transform.

3. The proximity detection device according to claim 2, wherein a transmission voltage matrix that determines a pattern driven by the multiline driving unit is an Hadamard matrix according to the Sylvester's construction method, a matrix in which rows or columns of an Hadamard matrix according to the Sylvester's construction method are exchanged, or a submatrix thereof formed by multiplying a specified row by "−1", and a computation equal to multiplication by "−1" of measurement values of the current measurement unit corresponding to the row multiplied by "−1" is performed in the fast Hadamard transform or the transform equal to the fast Hadamard transform.

4. The proximity detection device according to claim 2, wherein a transmission voltage matrix that determines a pattern driven by the multiline driving unit is an Hadamard matrix according to the Sylvester's construction method, a matrix in which rows or columns of an Hadamard matrix according to the Sylvester's construction method are exchanged, or a submatrix thereof formed by multiplying a specified column by "−1", and a computation equal to multiplication by "−1" of conversion values corresponding to the column multiplied by "−1" is performed in the fast Hadamard transform or the transform equal to the fast Hadamard transform.

5. The proximity detection device according to claim 1, wherein a pattern driven by the multiline driving unit is an inverse matrix of an Hadamard matrix or an inverse matrix of a submatrix of an Hadamard matrix.

6. An information equipment comprising an input device including the proximity detection device according to claim 1.

7. The information equipment according to claim 6, including a cellular phone having the input device.

8. The information equipment according to claim 6, including a multimedia player having the input device.

9. The information equipment according to claim 6, including a navigation system having the input device.

10. The information equipment according to claim 6, including a computer having the input device.

11. An information equipment comprising:

a display that outputs information and has a detection area;

a proximity detection device according to claim 1 that receives an input from the detection area of the display and detects an approach and/or a location of an object relative to the detection area; and a processing unit that controls operation of the proximity detection device and the display output.

12. A proximity detection method for detecting an approach and/or a position of an object, comprising:

simultaneously applying periodic alternating voltages to plural transmitting electrodes corresponding to one dimension of two dimensions in a detection area for detection of the approach of the object;

measuring currents or amounts of accumulated charge from receiving electrodes corresponding to the other of the two dimensions in the detection area in synchronization with driving of the transmitting electrodes; and performing linear computation by a fast Hadamard transform; performing conversion into values in response to electrostatic capacitances of respective intersections between the transmitting electrodes and the receiving electrodes, and performing computation to detect the approach and/or the position of the object toward the detection area.

13. The proximity detection method according to claim 12, wherein during the linear computation, the fast Hadamard transform performs computation of multiplying at least one specified value of a computation table by "−1".

14. The proximity detection method according to claim 12, wherein a computation equal to multiplication by "−1" of at least one measurement value from the measurement step corresponding to a row of the Hadamard transform is multiplied by "−1".

15. The proximity detection method according to claim 12, wherein a computation equal to multiplication by "−1" of at least one conversion value corresponding to a column of the Hadamard transform is multiplied by "−1.".

16. The proximity detection method according to claim 12, wherein an inverse matrix of a pattern driven in multiline during the simultaneous application of the periodic alternating voltages is a submatrix of a matrix equal to an Hadamard matrix.

17. A proximity detection device for detecting an approach and/or a position of an object relative to a detection area, the proximity detection device comprising:

a plurality of transmitting electrodes and receiving electrodes associated with the detection area;

a multiline driving unit that simultaneously applies periodic alternating voltages to at least two of the transmitting electrodes;

a measurement unit that measures magnitudes of currents or amounts of accumulated charge from the plurality of receiving electrodes in synchronization with the simultaneous application of periodic alternating voltages to the at least two transmitting electrodes by the multiline driving unit;

a linear computing unit that performs linear computation of measurement results from the measurement unit in response to electrostatic capacitances of respective intersections between the transmitting electrodes and the receiving electrodes, the linear computing unit having a memory unit that stores an output of the linear computation for readout at plural times; and a proximity computing unit that performs a computation to determine an approach and/or a position of an object relative to the detection area based on the output from the linear computing unit stored in the memory unit.

18. The proximity detection device according to claim 17, wherein the linear computing unit performs a fast Hadamard transform or a transform equal to the fast Hadamard transform.

19. The proximity detection device according to claim 17, wherein a pattern driven by the multiline driving unit is an inverse matrix of an Hadamard matrix or an inverse matrix of a submatrix of an Hadamard matrix.

20. An information equipment comprising:

a display that outputs information;

a proximity detection device according to claim 17 that receives an input from a detection area of the display and detects an approach and/or a location of an object relative to the detection area; and a processing unit that controls operation of the proximity detection device and the display output.

* * * * *